(12) United States Patent  
Nago

(10) Patent No.: US 9,233,731 B1  
(45) Date of Patent: Jan. 12, 2016

(54) BICYCLE RIM BRAKE

(71) Applicant: Shimano Inc., Sakai, Osaka (JP)

(72) Inventor: Daisuke Nago, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/447,545

(22) Filed: Jul. 30, 2014

(51) Int. Cl.
  *B62L 1/12* (2006.01)
  *B62L 3/02* (2006.01)

(52) U.S. Cl.
  CPC ... *B62L 1/12* (2013.01); *B62L 3/02* (2013.01); *B62L 3/023* (2013.01)

(58) Field of Classification Search
  CPC .............. B62L 1/12; B62L 3/02; B62L 3/023
  USPC ....................... 188/24.14, 24.12, 24.11, 24.22
  See application file for complete search history.

(56) References Cited

U.S. PATENT DOCUMENTS

| | | | | |
|---|---|---|---|---|
| 4,391,352 A | * | 7/1983 | Brown | 188/24.12 |
| 2009/0038894 A1 | * | 2/2009 | Liu et al. | 188/24.22 |
| 2010/0230215 A1 | * | 9/2010 | Ginster | 188/24.22 |
| 2013/0112510 A1 | | 5/2013 | Jordan et al. | |

* cited by examiner

*Primary Examiner* — Melanie Torres Williams
(74) *Attorney, Agent, or Firm* — Global IP Conselors

(57) ABSTRACT

A bicycle rim brake basically has a first brake arm, a second brake arm and a link. The first brake arm has a first coupling portion configured to pivot about a first pivot axis and a first mounting portion. The second brake arm has a second coupling portion configured to pivot about the first pivot axis and a second mounting portion. The second mounting portion is configured to mount a second friction member. The link is pivotally coupled to the second brake arm about a second pivot axis that is offset from the first pivot axis. The link has a coupling structure configured to be coupled with a movable member and a contact portion contacting the first brake arm. The coupling structure is spaced from the second pivot axis. The contact portion pivots the first and second brake arms about the first pivot axis as the link pivots about the second pivot axis.

11 Claims, 7 Drawing Sheets

BICYCLE RIM BRAKE

BACKGROUND

1. Field of the Invention

This invention generally relates to a bicycle rim brake. More specifically, the present invention relates to a bicycle rim brake having a pair of brake arms pivotally mounted to a bicycle.

2. Background Information

Bicycles are typically provided with at least one brake device for stopping. Currently, a wide variety of bicycle brake devices are available. One of the most popular types of bicycle brake devices is a rim brake. Rim brakes are configured to apply a braking force to the wheel of a bicycle by pinching the rim of the wheel with a pair of brake shoes attached to a pair of brake arms. One well-known example of a bicycle rim brake assembly is the caliper brake. Caliper brakes are also available in several configurations. For example, caliper brakes include a side pull type, a center pull type and a dual-pivot, side pull type. One example of a caliper brake is disclosed in U.S. Pat. No. 5,819,880.

SUMMARY

Generally, the present disclosure is directed to various features of a bicycle rim brake. In one feature, a bicycle rim brake is provided with a link to improve the braking performance.

In view of the state of the known technology and in accordance with a first aspect of the present disclosure, a bicycle rim brake is provided that basically comprises a first brake arm, a second brake arm and a link. The first brake arm has a first coupling portion configured to pivot about a first pivot axis and a first mounting portion. The first mounting portion is configured to mount a first friction member and extend from the first coupling portion. The second brake arm has a second coupling portion that is configured to pivot about the first pivot axis and a second mounting portion. The second mounting portion is configured to mount a second friction member and extending from the second coupling portion. The link is pivotally coupled to the second brake arm about a second pivot axis that is offset from the first pivot axis. The link includes a coupling structure configured to be coupled with a movable member and a contact portion contacting the first brake arm. The coupling structure is arranged to be spaced from the second pivot axis, the contact portion is arranged to pivot the first and second brake arms about the first pivot axis as the link pivots about the second pivot axis.

In accordance with a second aspect of the present invention, the bicycle rim brake according to the first aspect is configured so that the contact portion of the link is located closer to the second pivot axis than the coupling structure of the link.

In accordance with a third aspect of the present invention, the bicycle rim brake according to the first aspect is configured so that the contact portion of the link is a contact projection having a free end contacting the first brake arm.

In accordance with a fourth aspect of the present invention, the bicycle rim brake according to the third aspect is configured so that the first brake arm has a projecting part contacting the contact projection of the link.

In accordance with a fifth aspect of the present invention, the bicycle rim brake according to the first aspect is configured so that the first brake arm has a projecting part contacting the contact portion of the link.

In accordance with a sixth aspect of the present invention, the bicycle rim brake according to the first aspect further comprises a mounting member pivotally connecting the first and second coupling portions together and defining the first pivot axis.

In accordance with a seventh aspect of the present invention, the bicycle rim brake according to the first aspect is configured so that the movable member is connected between the second brake arm and the coupling structure of the link, the movable member is movably coupled to the second brake arm to change a distance between the second brake arm and the coupling structure of the link.

In accordance with an eighth aspect of the present invention, the bicycle rim brake according to the seventh aspect is configured so that the second brake arm includes a hydraulic cylinder having a piston slidably disposed in the hydraulic cylinder, and the movable member connects the coupling structure of the link to the piston.

In accordance with a ninth aspect of the present invention, the bicycle rim brake according to the eighth aspect is configured so that the hydraulic cylinder is an integral part of the second brake arm.

In accordance with a tenth aspect of the present invention, the bicycle rim brake according to the eighth aspect is configured so that the coupling structure of the link has a threaded hole and the movable member is screwed into the threaded hole such that rotation of the movable member adjusts a position of the link relative to the second brake arm.

In accordance with an eleventh aspect of the present invention, the bicycle rim brake according to the seventh aspect is configured so that the second brake arm includes a cable holder, and the movable member is an inner cable that extends from the cable holder and that is coupled to the coupling structure of the link.

In accordance with a twelfth aspect of the present invention, the bicycle rim brake according to the eleventh aspect is configured so that the cable holder is a cable barrel adjuster that is screwed into the second brake arm.

Also other objects, features, aspects and advantages of the disclosed bicycle rim brake will become apparent to those skilled in the art from the following detailed description, which, taken in conjunction with the annexed drawings, discloses illustrative embodiments of the bicycle rim brake.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
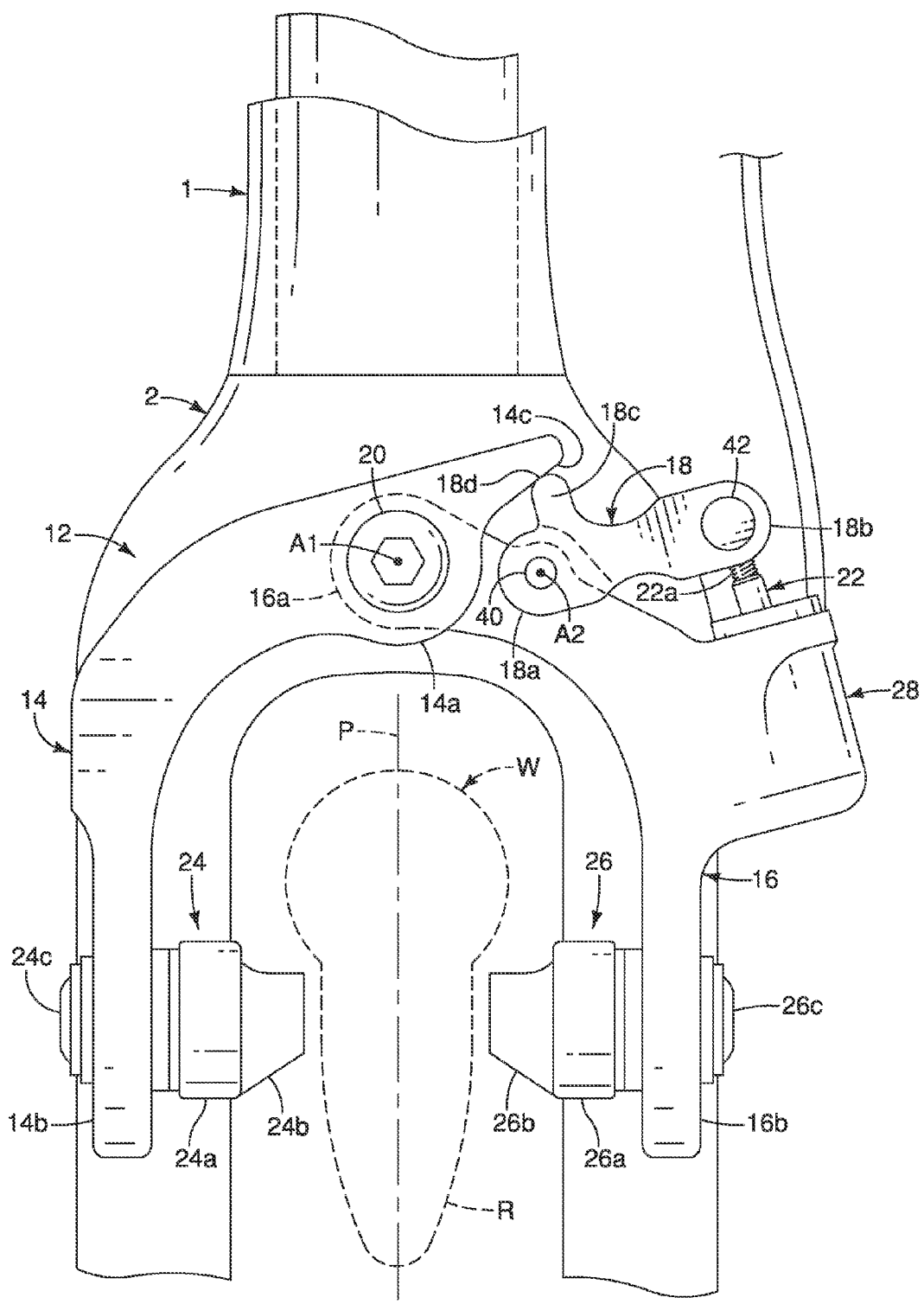
FIG. 1 is a front elevational view of a portion of a bicycle equipped with a bicycle rim brake in accordance with a first embodiment, with the bicycle rim brake being in a non-braking position or resting position.

Referring initially to FIG. 1, a portion of a bicycle 1 having a front fork 2 is illustrated that is equipped with a bicycle rim brake 12 in accordance with a first embodiment. The bicycle rim brake 12 is installed on the front fork 2 such that the bicycle rim brake 12 straddles a bicycle rim R of a front wheel W. Of course, it will be apparent to those skilled in the bicycle field from this disclosure that the bicycle rim brake 12 can be used in conjunction with a rear bicycle wheel. The bicycle rim brake 12 basically comprises a first brake arm 14, a second brake arm 16 and a link 18. The bicycle rim brake 12 further comprises a mounting member 20 that pivotally connects the first and second brake arms 14 and 16 together about a first pivot axis A1. The mounting member 20 also mounts the first and second brake arms 14 and 16 to the front fork 2. The link 18 is pivotally coupled to the second brake arm 16 about a second pivot axis A2 that is offset from the first pivot axis A1. The mounting member 20 is preferably located on a center longitudinal plane P of the bicycle 1.

Figure 3:
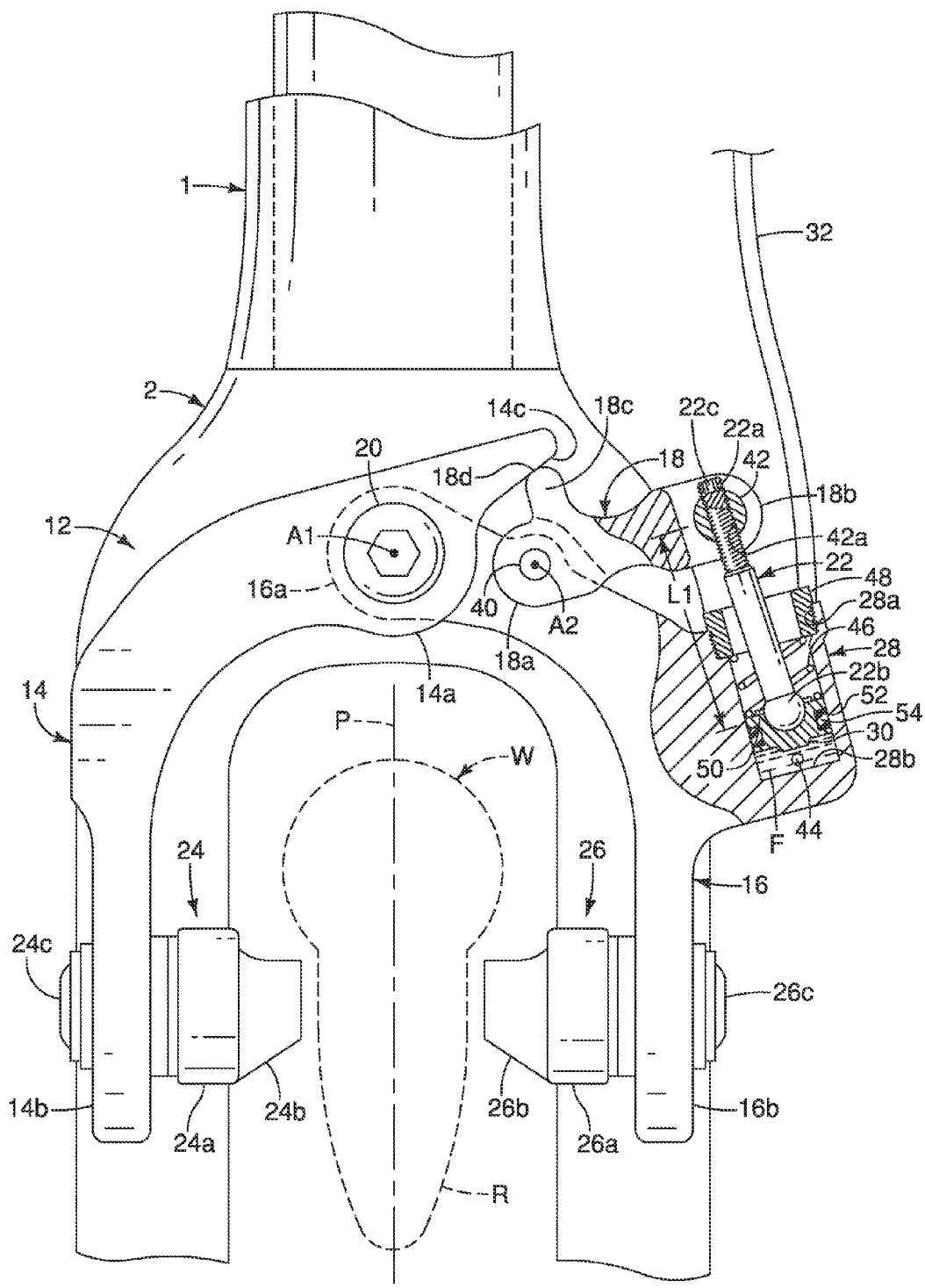
FIG. 3 is a front elevational view similar to FIG. 1, of the portion of the bicycle and the bicycle rim brake illustrated in FIGS. 1 and 2, but with portions shown in cross-sectional to illustrate a hydraulic braking system with the bicycle rim brake in a first resting position.
Figure 4:
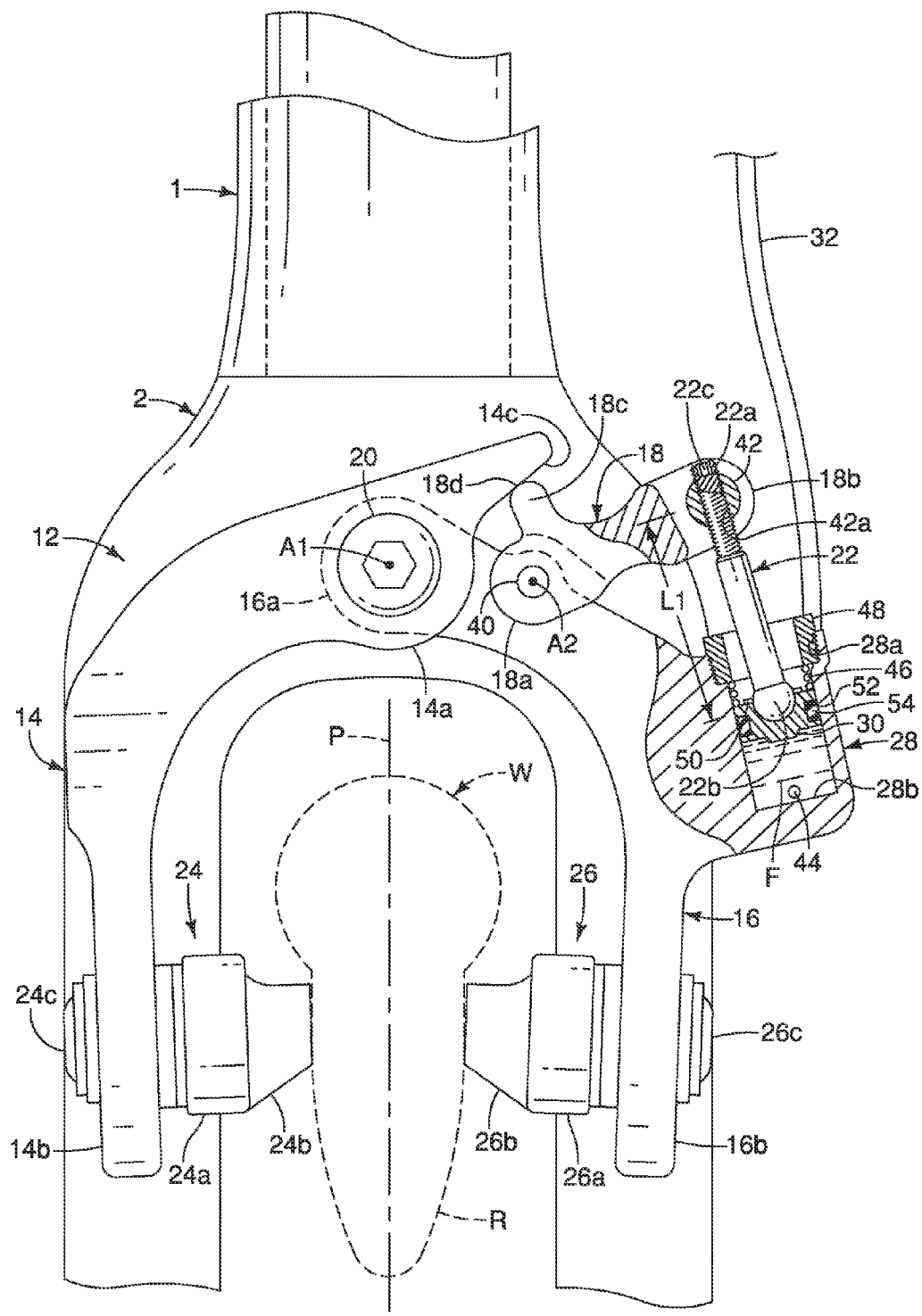
FIG. 4 is a front elevational view of the portion of the bicycle and the bicycle rim brake illustrated in FIG. 3, but with the hydraulic braking system operated to move the first and second brake arms via the link to a braking position.

In the first embodiment, the bicycle rim brake 12 is hydraulically actuated by a conventional hydraulic actuating device (e.g., a brake lever), which is not shown. Basically, as seen in FIGS. 3 and 4, the link 18 is moved by a movable member 22 that is operated by the brake lever (not shown) so as to pivot about the second pivot axis A2. This movement of the link 18 causes the first and second brake arms 14 and 16 to pivot about the first pivot axis A1 to apply a braking force to a bicycle wheel W by pinching a bicycle rim R of the bicycle wheel W as seen in FIG. 4.

Now, the first brake arm 14 will be discussed in more detail. The first brake arm 14 is a rigid member made of a suitable rigid material that is typically used for bicycle brake arms. For example, the first brake arm 14 can be a cold-forged aluminum arm or a carbon fiber reinforced arm. As seen from the view in FIGS. 1 and 3 to 5, the first brake arm 14 pivots about the first pivot axis A1 in a counterclockwise direction to contact the bicycle rim R, and the first brake arm 14 pivots about the first pivot axis A1 in a clockwise direction to move away from the bicycle rim R.

Figure 2:
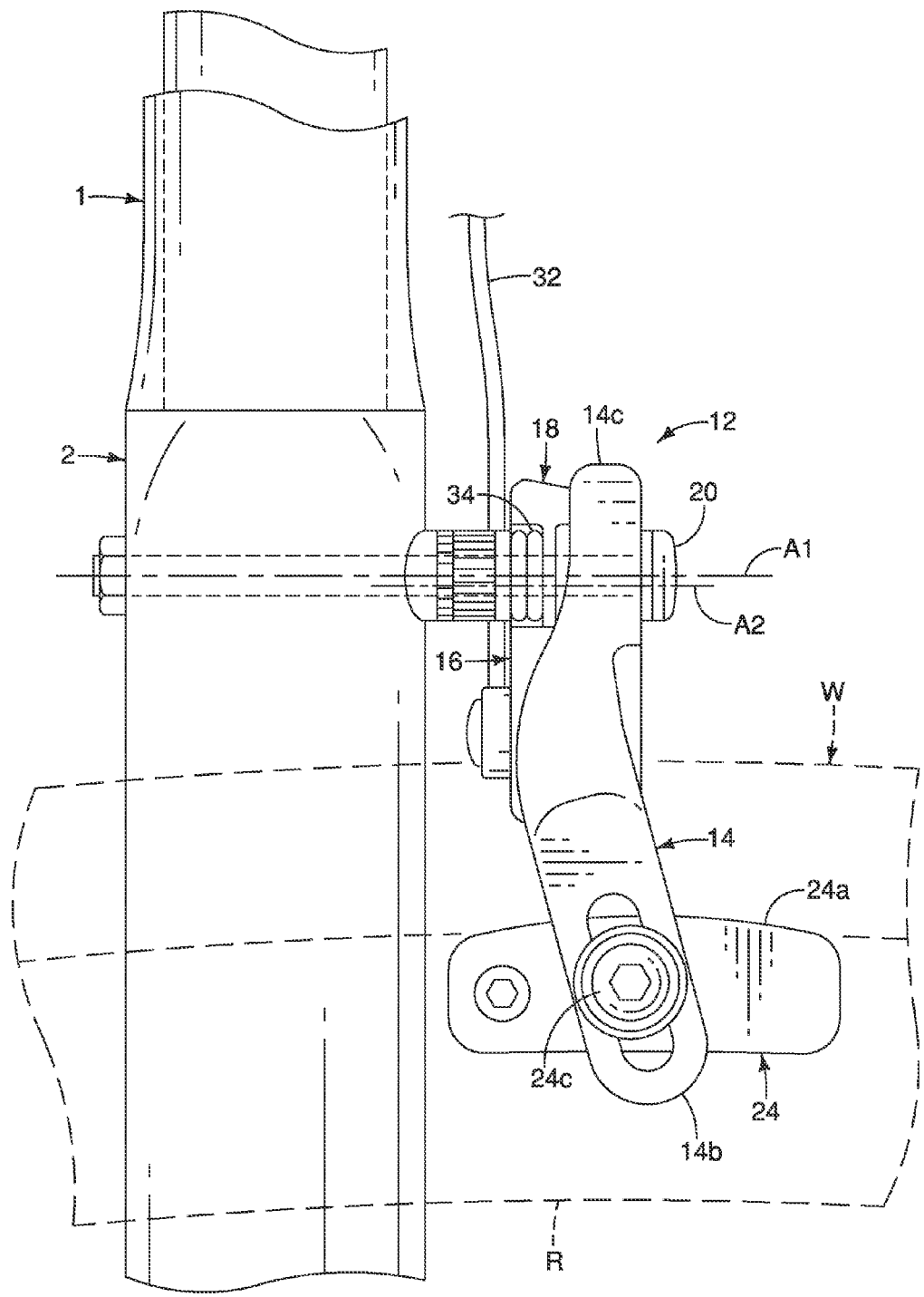
FIG. 2 is a side elevational view of the portion of the bicycle and the bicycle rim brake illustrated in FIG. 1.

Basically, the first brake arm 14 has a first coupling portion 14a and a first mounting portion 14b. The first brake arm 14 further includes a projecting part 14c for contacting the link 18. The first coupling portion 14a is configured to pivot about the first pivot axis A1. The first coupling portion 14a is pivotally coupled to the mounting member 20, which pivotally mounts the first brake arm 14 with respect to the front fork 2. The first mounting portion 14b extends from the first coupling portion 14a. The first mounting portion 14b is configured to mount a first friction member 24. In the illustrated embodiment, as seen in FIG. 2, the first mounting portion 14b includes a slot (elongated opening) for adjustably attaching the first friction member 24.

In the first embodiment, the first friction member 24 is a conventional brake shoe that is detachably attached to the first mounting portion 14b in a conventional manner. Basically, the first friction member 24 includes a brake pad holder 24a and a brake pad 24b. The brake pad holder 24a supports the brake pad 24b and is attached in the slot formed in the first mounting portion 14b by a mounting bolt 24c. The brake pad 24b of the first friction member 24 contacts one side of the bicycle rim R during a braking operation as seen in FIG. 4.

Now, the second brake arm 16 will be discussed in more detail. The second brake arm 16 is a rigid member made of a suitable rigid material such as the material that is used for the bicycle brake arms. For example, the second brake arm 16 can be a cold-forged aluminum arm or a carbon fiber reinforced arm. As seen from the view in FIGS. 1 and 3 to 5, the second brake arm 16 pivots about the first pivot axis A1 in a clockwise direction to contact the bicycle rim R and pivots about the first pivot axis A1 in a counterclockwise direction to move away from the bicycle rim R.

Basically, the second brake arm 16 has a second coupling portion 16a and a second mounting portion 16b. The second coupling portion 16a is configured to pivot about the first pivot axis A1. The second coupling portion 16a is pivotally coupled to the mounting member 20, which pivotally mounts the second brake arm 16 with respect to the front fork 2. Thus, as seen in FIGS. 1 and 2, the mounting member 20 pivotally connects the first and second coupling portions 14a and 16a together and defines the first pivot axis A1. In other words, the first and second coupling portions 14a and 16a are pivotally coupled around the first pivot axis A1 with respect to each other. The second mounting portion 16b extends from the second coupling portion 16a. The second mounting portion 16b is configured to mount a second friction member 26. Similar to the first mounting portion 14b, the second mounting portion 16b includes a slot (elongated opening) for adjustably attaching the second friction member 26.

In the first embodiment, the second friction member 26 is a conventional brake shoe that is detachably attached to the second mounting portion 16b in a conventional manner. Basically, the second friction member 26 includes a brake pad holder 26a and a brake pad 26b. The brake pad holder 26a supports the brake pad 26b and is attached in a slot formed in the second mounting portion 16b by a mounting bolt 26c. The brake pad 26b of the second friction members 26 contacts the other side of the bicycle rim R during a braking operation as seen in FIG. 4.

In the first embodiment, as seen in FIGS. 3 and 4, the second brake arm 16 includes a hydraulic cylinder 28 having a piston 30 slidably disposed in the hydraulic cylinder 28. Preferably, the hydraulic cylinder 28 is an integral part of the second brake arm 16. The piston 30 is connected to the movable member 22 such that movement of the piston 30 within the hydraulic cylinder 28 moves the movable member 22 which in turn pivots the link 18 about the second pivot axis A2. This pivotal movement of the link 18 pivots the first and second brake arms 14 and 16 about the first pivot axis A1 to apply a braking force to the bicycle rim R as seen in FIG. 4.

As seen in FIG. 2, a hydraulic hose 32 has a first end fixedly connected to the second brake arm 16. The hydraulic cylinder 28 is in fluid communication with the hydraulic hose 32. The hydraulic hose 32 further has a second end (not shown) connected to the hydraulic actuating device (not shown). During a braking operation, hydraulic fluid is forced into the hydraulic cylinder 28 causing the piston 30 to slide within the hydraulic cylinder 28. As a result of the sliding movement of the piston 30, the movable member 22 is pushed by the piston 30 to pivot the link 18 about the second pivot axis A2. As a result of the pivotal movement of the link 18, the first and second brake arms 14 and 16 are pivoted about the first pivot axis A1 by the link 18 from a non-braking position or resting position (FIG. 3) to a braking position (FIG. 4). In this way, the forces acting on each of the first and second brake arms 14 and 16 are similar, allowing the first and second brake arms 14 and 16 to gradually pivot in the braking direction simultaneously in a symmetrical fashion. The brake pads 24b and 26b then contact the bicycle rim R with a strength corresponding to the operating force exerted on the hydraulic actuating device (not shown).

As seen in FIG. 2 of the first embodiment, preferably, the bicycle rim brake 12 further includes a biasing member 34. In this embodiment, the biasing member 34 is a torsion spring. The biasing member 34 has a coiled portion disposed around the mounting member 20 and a pair of free ends engaging the first and second brake arms 14 and 16, respectively. The first and second brake arms 14 and 16 are biased to the non-braking position or resting position (FIG. 3). Thus, the first and second brake pads 24b and 26b are held in a preloaded open state by the biasing member 34.

The link 18 will now be discussed in more detail. The link 18 is a rigid member made of a suitable rigid material such as the material that is used for the first and second brake arms 14 and 16. For example, the link 18 can be formed of an aluminum alloy or a carbon fiber reinforced material. The link 18 serves as a connecting structure between the first and second brake arms 14 and 16 and the movable member 22. As seen in FIGS. 1 to 5 of the first embodiment, the link 18 has an attachment structure 18a. The link 18 is pivotally coupled to the second brake arm 16 by the attachment structure 18a about the second pivot axis A2 that is offset from the first pivot axis A1. As seen from the view in FIGS. 1 and 3 to 5, the link 18 pivots about the second pivot axis A2 in a counterclockwise direction to move the first and second brake arms 14 and 16 into contact the bicycle rim R and pivots about the second pivot axis A2 in a clockwise direction to move the first and second brake arms 14 and 16 away from the bicycle rim R.

Here, the attachment structure 18a has a fork shape (a pair of flanges separated by a gap) that straddles the second brake arm 16. Each flange of the attachment structure 18a has a hole that receives a pivot pin 40, which is a part of the attachment structure 18a and defines the second pivot axis A2. The ends of the pivot pin 40 are press fitted in the holes of the attachment structure 18a, respectively. Thus, the link 18 is pivotally mounted to the second brake arm 16 by the pivot pin 40.

As seen in FIGS. 3 and 4, the link 18 further has a coupling structure 18b. The coupling structure 18b is configured to be coupled with the movable member 22. Here, the coupling structure 18b has a fork shape (a pair of flanges separated by a gap) that straddles a first coupling end 22a of the movable member 22. Each flange of the coupling structure 18b has a hole that receives a connecting pin 42, which is a part of the coupling structure 18b. The ends of the connecting pin 42 freely pivot within the holes of the coupling structure 18b, respectively. Thus, the connecting pin 42 forms a trunnion with respect to the link 18. The connecting pin 42 has a threaded hole 42a for adjustably coupling the movable member 22 to the link 18, as discussed below. The coupling structure 18b is arranged to be spaced from the second pivot axis A2. In the first embodiment, the attachment structure 18a and the coupling structure 18b are formed at opposite ends of the link 18.

As seen in FIGS. 3 and 4, the link 18 further includes a contact portion 18c. The contact portion 18c contacts the first brake arm 14 as explained below. In the first embodiment, the contact portion 18c is disposed between the attachment structure 18a and the coupling structure 18b. The contact portion 18c of the link 18 is located closer to the second pivot axis A2 than the coupling structure 18b of the link 18. The contact portion 18c is arranged to pivot the first and second brake arms 14 and 16 about the first pivot axis A1 as the link 18 pivots about the second pivot axis A2. The projecting part 14c of the first brake arm 14 contacts the contact portion 18c of the link 18. In particular, the contact portion 18c of the link 18 is a contact projection having a free end 18d for contacting the first brake arm 14. Thus, the projecting part 14c of the first brake arm 14 contacts the free end 18d of the contact projection (i.e., the contact portion 18c) of the link 18. In this way, the contact portion 18c of the link 18 directly contacts the first brake arm 14.

Figure 5:
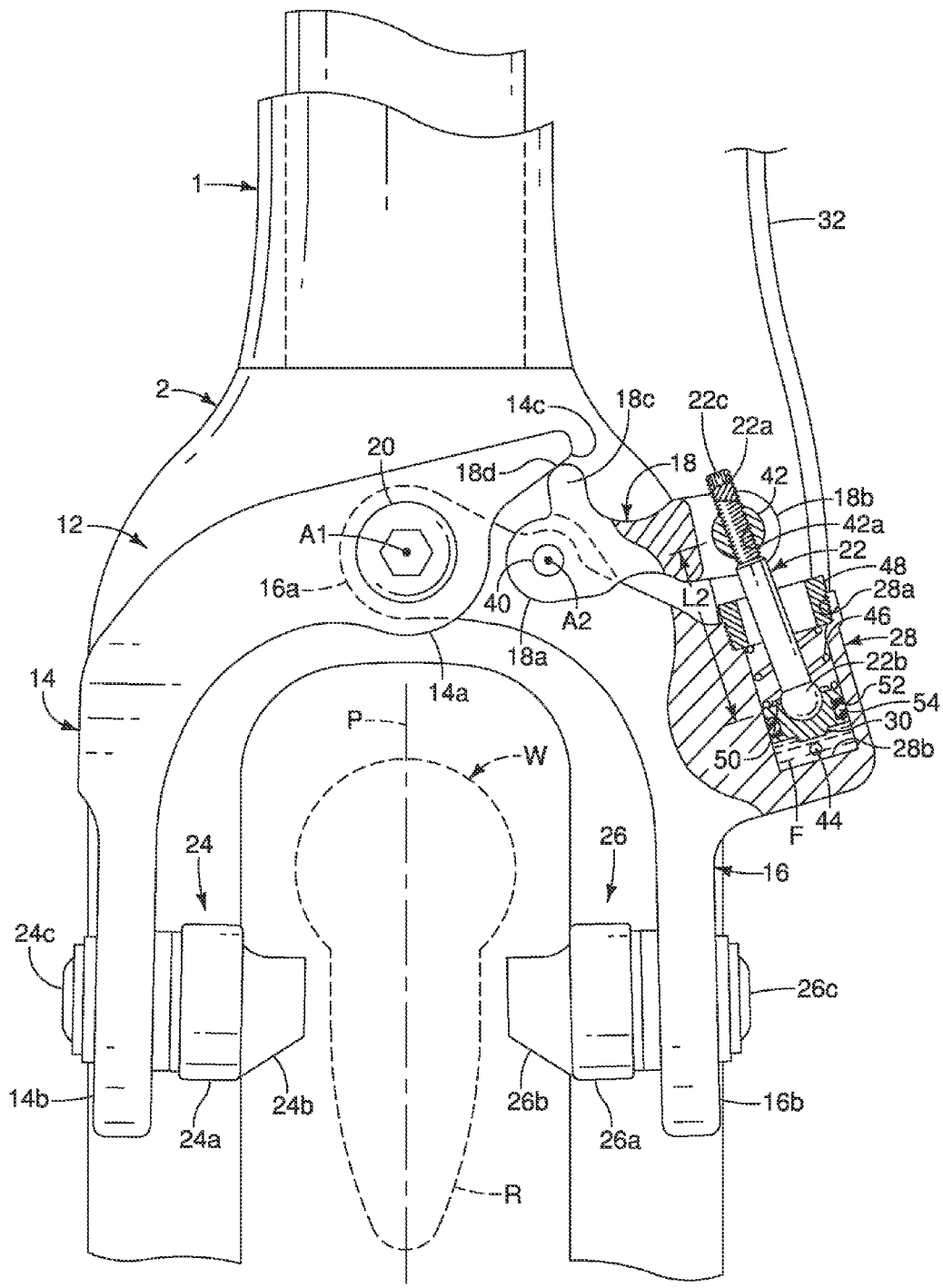
FIG. 5 is a front elevational view of the portion of the bicycle and the bicycle rim brake in FIGS. 3 and 4, but with the hydraulic braking system adjusted to establish a second resting position.

Now, the movable member 22 will be discussed in more detail. In the first embodiment, as seen in FIGS. 3 to 5, the movable member 22 is a piston rod, and the movable member 22 connects the coupling structure 18b of the link 18 to the piston 30. The movable member 22 includes a first coupling end 22a and a second coupling end 22b. The first coupling end 22a of the movable member 22 is threaded and is screwed into the threaded hole 42a of the connecting pin 42 of the coupling structure 18b. In other words, the first coupling end 22a has an external thread that engages an internal thread of the threaded hole 42a the connecting pin 42 of the coupling structure 18b.

The first coupling end 22a further includes a tool engagement structure 22c (e.g., a hex recess) for adjusting an effective length of the movable member 22. In other words, the movable member 22 is movably coupled to the second brake arm 16 to change a distance between the second brake arm 16 and the coupling structure 18b of the link 18. In this way, the movable member 22 is a connecting member that is screwed into the threaded hole 42a such that rotation of the movable member 22 adjusts a position of the link 18 relative to the second brake arm 16. That is, the position of the link 18 can be adjusted to accommodate one or more rest positions of the first and second brake arms 14 and 16 depending on the effective length of the movable member 22. In other words, a change in the position of the connecting pin 42 on the movable member 22 will correspond to a change in the position of the rest positions of the first and second brake arms 14 and 16. For example, in FIG. 3, the first and second brake arms 14 and 16 are each at a first rest position with the movable member 22 having a first effective length L1. At the user's discretion, the effective length of the movable member 22 can be adjusted to a second effective length L2 as seen in FIG. 5. At the second effective length L2, the first and second brake arms 14 and 16 are held at a second rest position as seen in FIG. 5, which is different than the first rest position as seen in FIG. 3. Since a screw connection is utilized to adjust the effective length of the movable member 22, an infinite number of rest positions of the first and second brake arms 14 and 16 are possible. This allows the user to finely adjust the gap between the bicycle rim R and each of the brake pads 24b and 26b.

The arrangement of the hydraulic cylinder 28 and the piston 30 will now be discussed in greater detail. As mentioned above, the second brake arm 16 includes the hydraulic cylinder 28. Preferably, the hydraulic cylinder 28 is an integral part of the second brake arm 16. In other words, the second brake arm 16 and the hydraulic cylinder 28 are formed together as a one-piece, unitary member. Thus, the second brake arm 16 defines the hydraulic cylinder 28. The hydraulic cylinder 28 basically defines a blind bore having an open end 28a and a closed end 28b. The second brake arm 16 has a filler port 44 that is in fluid communication with the hydraulic cylinder 28 for introducing hydraulic fluid F from the hydraulic actuating device (not shown) via the hydraulic hose 32. A biasing member 46 is disposed in the hydraulic cylinder 28 for biasing the piston 30 away from the open end 28a and towards the closed end 28b. Here, the biasing member 46 is a compression spring with the movable member 22 passing axially through the coils of the biasing member 46. A ring-shaped member 48 is fixed to the open end 28a for stopping one end of the biasing member 46. The other end of the biasing member 46 contacts one end surface of the piston 30 to bias the piston 30 towards the closed end 28b (i.e., the bottom end) of the hydraulic cylinder 28. Here, the ring-shaped member 48 has an external thread that screws into an internal thread at the open end 28a of the hydraulic cylinder 28. When the bicycle rim brake 12 is in the non-braking position as seen in FIGS. 3 and 5, the biasing member 46 is in a preloaded state. It will be apparent to those skilled in the bicycle field that the biasing member 46 can be omitted since the biasing member 34 is in a preloaded state to hold the first and second brake arms 14 and 16 in their rest positions, and thus, also biases the piston 30 towards the closed end 28b of the hydraulic cylinder 28.

The second coupling end 22b of the movable member 22 is operatively coupled to the piston 30. The second coupling end 22b has a partially spherical shape that is received in a partially spherical depression 30a of the piston 30. The second coupling end 22b is retained in the spherical depression 30a of the piston 30. For example, a stopper plate 50 is fixed to the end surface of the piston 30 for retaining the second coupling end 22b of the movable member 22 to the piston 30. With this arrangement, a ball joint is formed between the second coupling end 22b of the movable member 22 and the piston 30 so that the movable member 22 can pivot relative to the piston 30.

The piston 30 includes at least one ring-shaped groove 52 on the outer perimeter surface on which a sealing member 54 is mounted. In the first embodiment, the piston 30 slides within the hydraulic cylinder 28 in order to pivot the first and second brake arms 14 and 16 about the first pivot axis A1 in response to operation of the hydraulic actuating device (not shown).

In response to operation of the hydraulic actuating device, the piston 30 moves the movable member 22, which pivots the link 18 which in turn pivots the first and second brake arms 14 and 16. In particular, in performing a braking operation, the hydraulic fluid F will be forced from the hydraulic hose 32 into the hydraulic cylinder 28. The hydraulic fluid F will cause the piston 30 to slide in the hydraulic cylinder 28 against the biasing force of the biasing members 34 and 46. In turn, the movable member 22 is pushed generally in an axial direction of the movable member 22 to pivot the link 18 about the second pivot axis A2. In the braking operation, the link 18 will pivot in a counterclockwise direction around the second pivot axis A2 as viewed in FIGS. 1 and 3 to 5. In the illustrated embodiment, the contact portion 18c of the link 18 pushes against the projecting part 14c of the first brake arm 14 such that the first and second brake arms 14 and 16 simultaneously pivot about the first pivot axis A1 in opposite directions. The pivotal movement of the first and second brake arms 14 and 16 cause the brake pads 24b and 26b to pinch the bicycle rim R as seen in FIG. 4.

Figure 6:
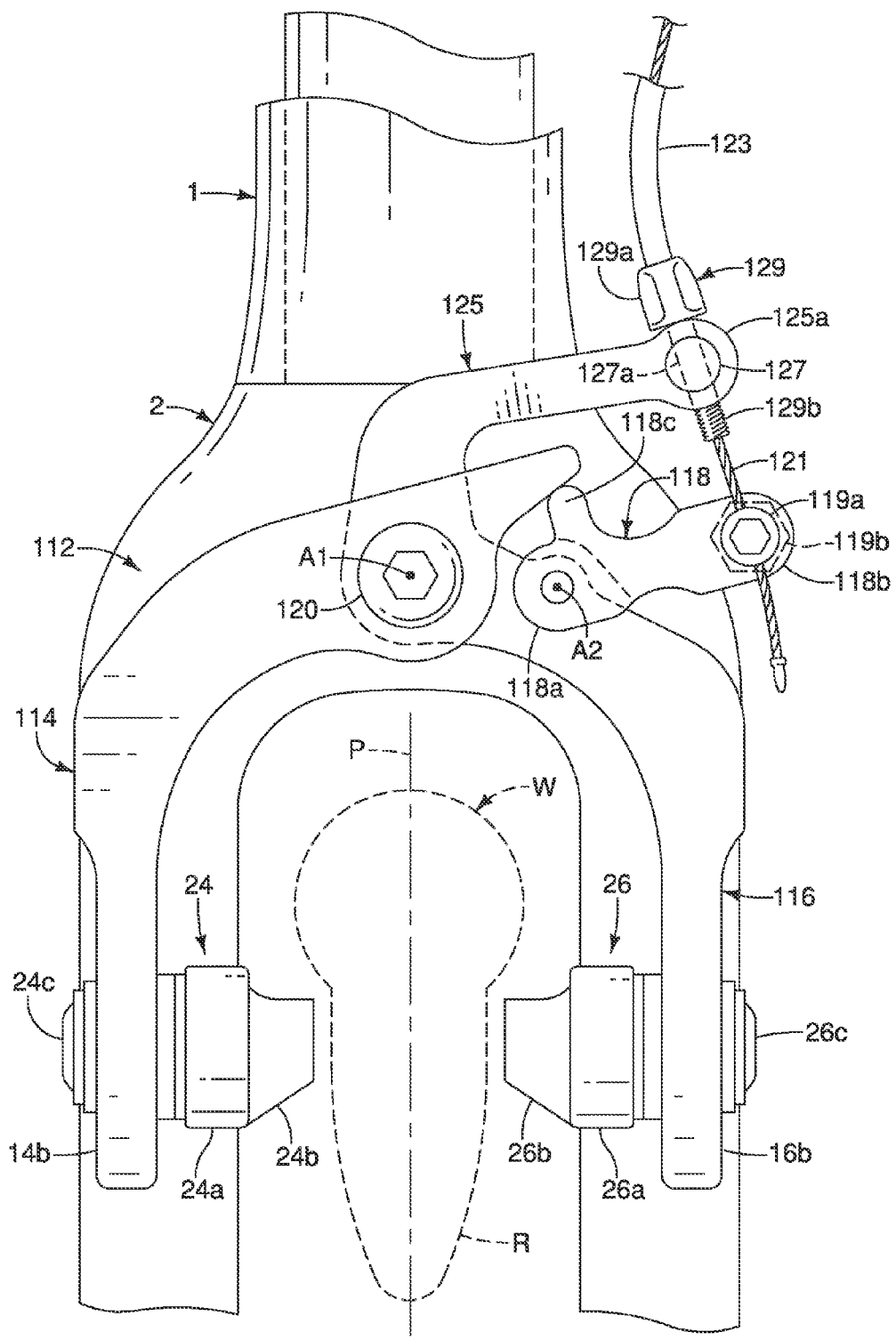
FIG. 6 is a front elevational view of a portion of a bicycle equipped with a bicycle rim brake in accordance with a second embodiment.
Figure 7:
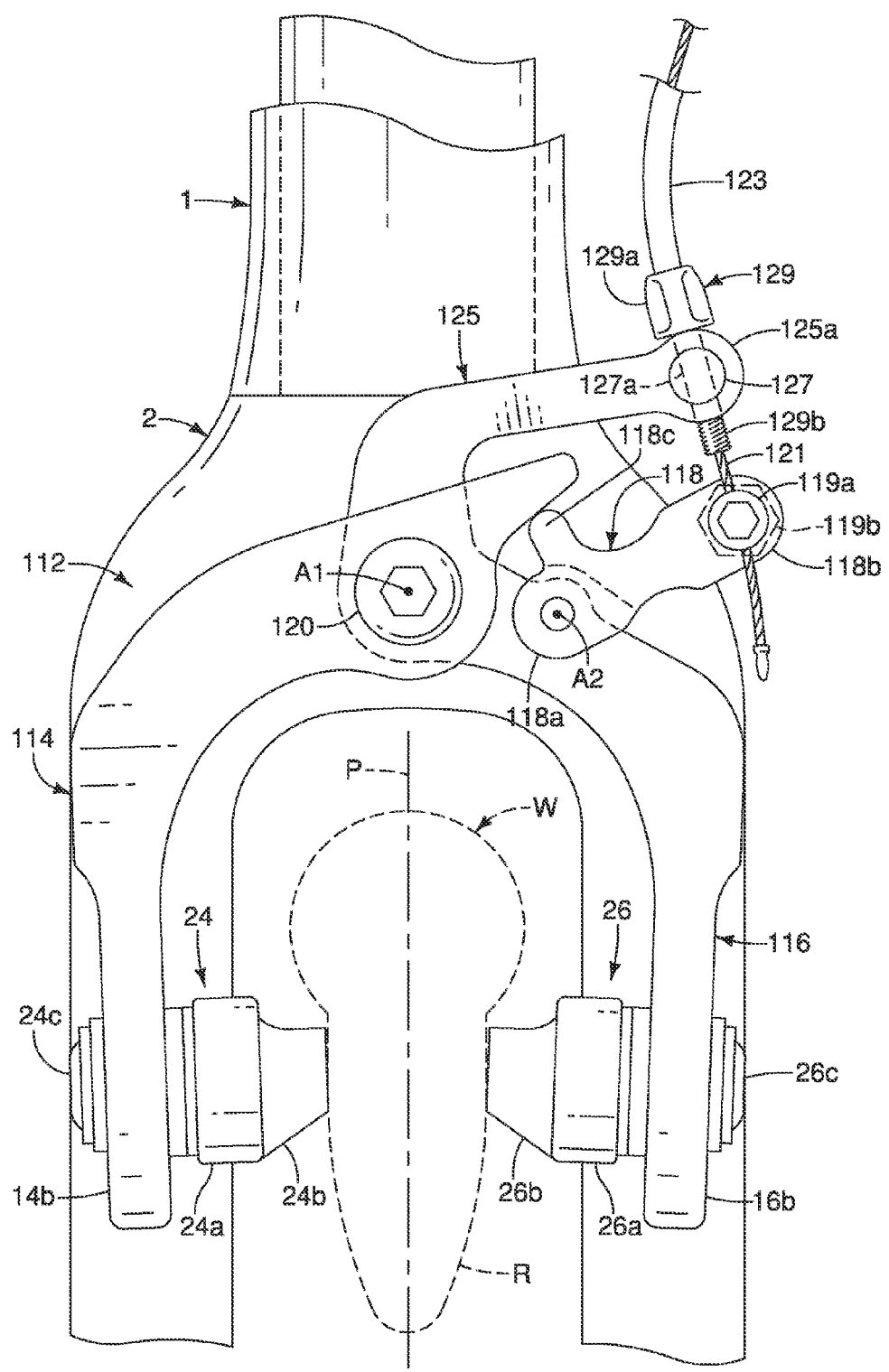
FIG. 7 is a front elevational view, similar to FIG. 6, of the portion of the bicycle and the bicycle rim brake illustrated in FIG. 6, but with the bicycle rim brake in a braking position.

Referring now to FIGS. 6 and 7, a bicycle rim brake 112 in accordance with the second embodiment will now be discussed. In view of the similarity between the first and second embodiments, the bicycle rim brake 112 will only be briefly discussed for the sake of brevity. Moreover, the parts of the second embodiment, which are identical or identical in function to the corresponding parts of the first embodiment, will be given the same reference numbers as in the first embodiment but increased by one hundred.

The bicycle rim brake 112 basically comprises a first brake arm 114, a second brake arm 116 and a link 118. The bicycle rim brake 112 further comprises a mounting member 120 that pivotally connects the first and second brake arms 114 and 116 together about the first pivot axis A1. Similar to the first embodiment, the link 118 is pivotally coupled to the second brake arm 116 about the second pivot axis A2. Here, the first brake arm 114 and the mounting member 120 are identical to the first brake arm 14 and the mounting member 20 of the first embodiment, respectively. The second embodiment differs from the first embodiment in that the second brake arm 116 and the link 118 are configured to be coupled to a movable member 121 that is in the form of an inner cable of a control cable (i.e., a Bowden cable). The control cable (Bowden cable) includes the movable member 121 (i.e., the inner cable) and the outer casing 123. The movable member 121 (the inner cable) is slidably covered by the outer casing 123. In other words, the movable member 121 of the second brake arm 116 serves a similar function as the movable member 22, except the movable member 121 is an inner cable of a Bowden cable rather than the piston rod.

In the second embodiment, the second brake arm 116 is provided with an extension arm 125 having a supporting structure 125a with a fork shape (a pair of flanges separated by a gap). Each flange of the supporting structure 125a has a hole that receives a connecting pin 127, which is a part of the supporting structure 125a. The second brake arm 116 includes a cable holder 129 that is movably supported by the supporting structure 125a of the second brake arm 116. In particular, the ends of the connecting pin 127 are freely pivotally supported within the holes of the supporting structure 125a, respectively. Thus, the connecting pin 127 forms a trunnion with respect to the second brake arm 116. The connecting pin 127 has a threaded hole 127a. In the second embodiment, the cable holder 129 is a cable barrel adjuster (i.e., a cable adjuster bolt) that is screwed into the second brake arm 116 to adjust tension of the movable member 121 (the inner cable). In particular, the cable holder 129 has an outer casing support part 129a and a hollow threaded shaft part 129b. The hollow threaded shaft part 129b is screwed into the threaded hole 127a for adjustably attaching the cable holder 129 to the second brake arm 116 to adjust tension of the movable member 121. The second brake arm 116 of the second embodiment is identical to the second brake arm 16 in the first embodiment, except the second brake arm 116 is provided with the extension arm 125 and does not include a hydraulic cylinder.

The link 118 includes an attachment structure 118a, a coupling structure 118b and a contact portion 118c. The attachment structure 118a and the contact portion 118c of the link 118 are identical to the attachment structure 18a and the contact portion 18c of the link 18. On the other hand, the coupling structure 118b differs from the coupling structure 18b of the link 18. In particular, the coupling structure 118b is an inner cable clamp that has a clamp nut 119a and a clamp bolt 119b. The movable member 121 (the inner cable) is clamped between the clamp nut 119a and a head portion of the clamp bolt 119b. Such the inner cable clamp is a conventional structure that is commonly used to attach an inner cable to a brake arm. Thus, the coupling structure 118b will not be discussed and/or illustrated in detail herein. The movable member 121 is an inner cable, as mentioned above, that extends from the cable holder 129 and that is coupled to the coupling structure 118b of the link 118.

In the second embodiment, alternatively, the clamp bolt 119b can form trunnion with respect to the link 118 similar to the connecting pins 42 and 127 above. In this case, the coupling structure 118b has a fork shape (a pair of flanges separated by a gap). Each flange of the coupling structure 118b has a hole that receives the clamp bolt 119b, which is a part of the coupling structure 118b. The clamp nut 119a and the clamp bolt 119b are freely pivotally supported by the link 118, respectively. In this case, the connecting pin 127 would be fixedly provided on the second brake arm 116.

In response to operation of a cable actuating device, e.g., a cable operating brake lever (not shown), the movable member 121 (i.e., the inner cable) pulls the coupling structure 118b of the link 118 towards supporting structure 125a of the second brake arm 116. In particular, the link 118 will pivot about the second pivot axis A2 in the counterclockwise direction as viewed in FIGS. 6 and 7. The contact portion 118c of the link 118 contacts the first brake arm 114 so that the first and second brake arms 114 and 116 simultaneously pivot in opposite directions about the first pivot axis A1. The simultaneous movement of the first and second brake arms 114 and 116 causes the brake pads of the first and second brake arms 114 and 116 to pinch the bicycle rim R as seen in FIG. 7.

The effects of the present invention at least include:
1. synchronization (synchronized movements) between the first and second brake arms 14, 16 or 114, 116 can be easily obtained by using the link 18 or 118 as compare with a configuration in which the movable member 22 or 121 is directly connected to the first brake arm 14 or 114 without using the link 18 or 118; and
2. the hydraulic cylinder 28 can be relatively small because the movement/pivot amount of the first and second brake arms 14, 16 or 114, 116 with respect to the movement amount of movable member 22 or 121 becomes large by using the link 18 or 118 as compare with a configuration in which the movable member 22 or 121 is directly connected to the first brake arm 14 or 114 without using the link 18 or 118.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle rim brake 12. Accordingly, these directional terms, as utilized to describe the bicycle rim brake 12 should be interpreted relative to a bicycle in an upright riding position on a horizontal surface and that is equipped with the bicycle rim brake. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as the changes do not substantially affect their intended function. Components that are shown directly connected or contacting each other can have intermediate structures disposed between them so long as the changes do not substantially affect their intended function. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is clamed is:
1. A bicycle rim brake comprising:
a first brake arm having a first coupling portion configured to pivot about a first pivot axis and a first mounting portion, the first mounting portion being configured to mount a first friction member and extending from the first coupling portion;
a second brake arm having a second coupling portion configured to pivot about the first pivot axis and a second mounting portion, the second mounting portion being configured to mount a second friction member and extending from the second coupling portion; and
a link pivotally coupled to the second brake arm about a second pivot axis that is offset from the first pivot axis, the link having a coupling structure configured to be coupled with a movable member and a contact projection having a free end contacting the first brake arm, the coupling structure being arranged to be spaced from the second pivot axis, the contact portion being arranged to pivot the first and second brake arms about the first pivot axis as the link pivots about the second pivot axis.
2. The bicycle rim brake according to claim 1, wherein the contact portion of the link is located closer to the second pivot axis than the coupling structure of the link.

3. The bicycle rim brake according to claim 1, wherein
the first brake arm has a projecting part contacting the contact projection of the link.

4. The bicycle rim brake according to claim 1, further comprising
a mounting member pivotally connecting the first and second coupling portions together and defining the first pivot axis.

5. The bicycle rim brake according to claim 1, wherein
the movable member is connected between the second brake arm and the coupling structure of the link, the movable member is movably coupled to the second brake arm to change a distance between the second brake arm and the coupling structure of the link.

6. The bicycle rim brake according to claim 5, wherein
the second brake arm includes a cable holder; and
the movable member is an inner cable that extends from the cable holder and that is coupled to the coupling structure of the link.

7. The bicycle rim brake according to claim 6, wherein
the cable holder is a cable barrel adjuster that is screwed into the second brake arm.

8. A bicycle rim brake according comprising:
a first brake arm having a first coupling portion configured to pivot about a first pivot axis and a first mounting portion, the first mounting portion being configured to mount a first friction member and extending from the first coupling portion;
a second brake arm having a second coupling portion configured to pivot about the first pivot axis and a second mounting portion, the second mounting portion being configured to mount a second friction member and extending from the second coupling portion; and
a link pivotally coupled to the second brake arm about a second pivot axis that is offset from the first pivot axis, the link having a coupling structure configured to be coupled with a movable member and a contact portion contacting the first brake arm, the first brake arm having a projecting part contacting the contact portion of the link, the coupling structure being arranged to be spaced from the second pivot axis, the contact portion being arranged to pivot the first and second brake arms about the first pivot axis as the link pivots about the second pivot axis.

9. A bicycle rim brake comprising:
a first brake arm having a first coupling portion configured to pivot about a first pivot axis and a first mounting portion, the first mounting portion being configured to mount a first friction member and extending from the first coupling portion;
a second brake arm including a hydraulic cylinder having a piston slidably disposed in the hydraulic cylinder, the second brake arm having a second coupling portion configured to pivot about the first pivot axis and a second mounting portion, the second mounting portion being configured to mount a second friction member and extending from the second coupling portion; and
a link pivotally coupled to the second brake arm about a second pivot axis that is offset from the first pivot axis, the link having a coupling structure configured to be coupled with a movable member and a contact portion contacting the first brake arm, the coupling structure being arranged to be spaced from the second pivot axis, the contact portion being arranged to pivot the first and second brake arms about the first pivot axis as the link pivots about the second pivot axis,
the movable member being connected between the second brake arm and the coupling structure of the link, the movable member being movably coupled to the second brake arm to change a distance between the second brake arm and the coupling structure of the link, the movable member connecting the coupling structure of the link to the piston.

10. The bicycle rim brake according to claim 9, wherein
the hydraulic cylinder is an integral part of the second brake arm.

11. The bicycle rim brake according to claim 9, wherein
the coupling structure of the link has a threaded hole and the movable member is screwed into the threaded hole such that rotation of the movable member adjust a position of the link relative to the second brake arm.

\* \* \* \* \*